(12) United States Patent
Frisch et al.

(10) Patent No.: US 12,085,127 B2
(45) Date of Patent: Sep. 10, 2024

(54) SEGMENTAL BEARING DEVICE COMPRISING AN INTERFERENCE REGION, AND SWIVEL LEVEL ARRANGEMENT COMPRISING THE SEGMENTAL BEARING DEVICE

(71) Applicant: Schaeffler Technologies AG & Co. KG, Herzogenaurach (DE)

(72) Inventors: Richard Frisch, Obermichelbach (DE); Dieter Jauernig, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 71 days.

(21) Appl. No.: 17/798,891

(22) PCT Filed: Jan. 14, 2021

(86) PCT No.: PCT/DE2021/100037
§ 371 (c)(1),
(2) Date: Aug. 11, 2022

(87) PCT Pub. No.: WO2021/160205
PCT Pub. Date: Aug. 19, 2021

(65) Prior Publication Data
US 2023/0085808 A1 Mar. 23, 2023

(30) Foreign Application Priority Data
Feb. 13, 2020 (DE) ...................... 10 2020 103 717.1

(51) Int. Cl.
*F16C 33/46* (2006.01)
*F16C 19/50* (2006.01)

(52) U.S. Cl.
CPC ........ *F16C 33/4605* (2013.01); *F16C 19/502* (2013.01); *F16C 2361/45* (2013.01)

(58) Field of Classification Search
CPC ...... F16C 19/463; F16C 19/466; F16C 19/50; F16C 19/502; F16C 33/4605; F16C 41/04; F16C 2361/45
See application file for complete search history.

(56) References Cited

FOREIGN PATENT DOCUMENTS

| CN | 103161822 A | 6/2013 |
|---|---|---|
| CN | 105264243 A | 1/2016 |
| CN | 106030131 A | 10/2016 |
| CN | 106133347 A | 11/2016 |

(Continued)

OTHER PUBLICATIONS

Machine Translation of WO-2007009542-A1 (Year: 2007).*

*Primary Examiner* — Alan B Waits

(57) ABSTRACT

A segmental bearing device includes a plurality of rolling elements, a segmental cage for receiving the plurality of rolling elements, and a partial shell. The segmental cage has a first end region and a first interference region disposed in the first end region. The partial shell has a bearing race for the plurality of rolling elements, and first and second axial guide flanges for axially guiding the segmental cage. The first interference region lies against the first axial guide flange, axially clamping the segmental cage. The segmental cage may also include a second end region, axially opposite the first end region, and a second interference region disposed in the second end region. The second interference region lies against the second axial guide flange, axially clamping the segmental cage.

13 Claims, 3 Drawing Sheets

(56) References Cited

FOREIGN PATENT DOCUMENTS

| | | | |
|---|---|---|---|
| CN | 106133348 A | 11/2016 | |
| DE | 102005034739 A1 | 2/2007 | |
| DE | 102013211447 A1 | 12/2014 | |
| DE | 102014206805 A1 | 10/2015 | |
| DE | 102015225259 A1 | 6/2017 | |
| EP | 2647865 A2 | 10/2013 | |
| WO | 2006122613 A2 | 11/2006 | |
| WO | WO-2007009542 A1 * | 1/2007 | ............ F16C 19/502 |
| WO | 2015154759 A1 | 10/2015 | |

* cited by examiner

SEGMENTAL BEARING DEVICE COMPRISING AN INTERFERENCE REGION, AND SWIVEL LEVEL ARRANGEMENT COMPRISING THE SEGMENTAL BEARING DEVICE

CROSS-REFERENCE TO RELATED APPLICATIONS

This application is the United States National Phase of PCT Appln. No. PCT/DE2021/100037 filed Jan. 14, 2021, which claims priority to German Application No. DE102020103717.1 filed Feb. 13, 2020, the entire disclosures of which are incorporated by reference herein.

TECHNICAL FIELD

The present disclosure relates to a segmental bearing device and a swivel lever arrangement with said segmental bearing device.

BACKGROUND

Normally, roller bearings allow the bearing partners to rotate relative to one another without limiting the angle of rotation. In some applications, however, only a swiveling of bearing partners relative to one another is to be supported. In such applications, it is sufficient that the roller bearing does not extend over 360°, but is limited to a partial angular range.

In such roller bearings, the cages are not secured in the corresponding raceways, particularly if the partial angular range is less than 180°. In this case, the cages and thus the rolling elements can fall out, resulting in an incorrect assembly in the worst case.

The publication DE102013 211 447 A1 discloses a half-shell bearing with a bearing shell and a cage with rolling elements rolling on the bearing shell, wherein the cage accommodated in a radially secured manner in the bearing shell is swivelable relative to the bearing shell. The cage can be releasably fixed to the bearing shell in a transport position by means of retaining means provided on the cage. In one embodiment, the cage has a longitudinal slit, wherein a web which runs in the circumferential direction and is divided by the longitudinal slit is arched in a bulbous manner at the center.

SUMMARY

The present disclosure provides an improved transport securing means for a segmental bearing device.

The disclosure provides a segmental bearing device, which is used for mounting a first bearing partner relative to a second bearing partner, specifically about a swivel axis. The segmental bearing device may be used in a swivel lever arrangement for a disc brake, which is described below.

The segmental bearing device has a plurality of rolling elements. The rolling elements may be designed as rollers, e.g., as needles. The rolling elements may be made of metal.

The segmental bearing device has a segmental cage for accommodating the rolling elements. The rolling elements may be disposed in a single row in the segmental cage. In alternative embodiments, these can also be disposed in two or more rows.

The segmental cage may have receptacles for the rolling elements. It can be provided for the rolling elements to be held captively in the segmental cage. The rolling elements in the segmental cage may be disposed with full complements in order to increase the load-bearing capacity. In this case, it can be provided for the rolling elements, e.g., designed as rollers, e.g., needles, to be only held in the segmental cage at the end. For example, retaining nubs can be provided at the ends, wherein the rolling elements are held radially on the inside by two retaining nubs and radially on the outside by two further retaining nubs.

The segmental bearing device and/or the segmental cage and/or the plurality of rolling elements extend(s) over an angular segment which is less than 200°, e.g., less than 180° or less than 135°. This limited extension in the circumferential direction means that the segmental bearing device is only designed for a swiveling movement, but not for a rotary movement, e.g., for a continuous rotary movement.

The segmental bearing device has a partial shell, e.g., a half-shell, wherein the partial shell provides a bearing race for the rolling elements. Furthermore, the partial shell guides the segmental cage in the axial direction and has guide flanges for this purpose. The partial shell may be designed as a shaped sheet metal part. In this embodiment, the bearing race for the rolling elements is designed as a metallic bearing race and is therefore durable. The guide flanges may be designed as shaped regions of the shaped sheet metal part. For example, the guide flanges may be designed to end straight in the radial direction and/or extend exclusively in a radial plane to the swivel axis.

The segmental cage may have at least one interference region so that the segmental cage lies against the axial guide flange or the axial guide flanges in the axial direction in a clamping manner. The clamping of the system ensures that the segmental cage cannot move freely relative to the partial shell or can only move against frictional resistance so as to provide a transport and/or assembly securing means. As a result, the segmental bearing device is in a defined transport and/or assembly state so that incorrect assembly is avoided. On the other hand, the interference region is dimensioned such that, in the installed state, the segmental bearing device can realize a swivelable mounting of the bearing partners.

In contrast to the background of the art, the at least one interference region may be disposed in an end region of the segmental cage. The fact that the at least one interference region is disposed in the end region of the segmental cage means that a bulbous segmental cage which tends to tilt in the partial shell is avoided. Furthermore, weakening regions, such as the longitudinal slit mentioned at the outset, can be avoided in a central region of the segmental cage so as to increase its stability. A simplified manufacture of the segmental cage can be beneficial.

The interference region may be made of the same material as the segmental cage so that no additional costs arise during manufacture due to the interference region. Alternatively or in addition, the interference region is designed as a material thickened portion of the segmental cage in the axial direction.

In an example embodiment, an interference region is disposed at the end region on each axial side. The two interference regions may be disposed symmetrically with respect to one another. This avoids the segmental cage tilting relative to the partial shell or being positioned asymmetrically.

In a further embodiment, such an interference region is disposed at each end region, i.e. on each free end of the segmental cage on each axial side. The interference regions may be constructed identically and/or symmetrically with respect to one another. Owing to this four-point support, the segmental cage is in the correct position in the transport and/or assembly state and is therefore ready for use relative to the partial shell.

In an example embodiment, such an interference region is disposed on at least one axial side at each end region. An intermediate region is provided between the two interference regions on the same axial side, wherein the intermediate region in the axial direction is set back relative to the end regions in the direction of the segmental cage. Alternatively or in addition, the intermediate region has play relative to the adjacent axial guide flange and/or is at a distance from it without contact. This implementation again underscores the idea that the segmental cage is clamped in the partial shell via the end regions, wherein the intermediate regions are designed without contact. Both axial sides of the segmental cage may have a corresponding structural design.

Considering the total length of the segmental cage in the circumferential direction, the intermediate region takes up at least 80%, e.g., at least 90%, of the total length. This also underscores the fact that the segmental cage should be disposed in the central region without contact with the partial shell in the axial direction.

In an example embodiment, the segmental cage has a side ring region. The segmental cage may have such a side ring region on both axial sides. A plurality of intermediate webs may extend in the axial direction between the side ring regions. The receptacles for the rolling elements are disposed between the intermediate webs. As an alternative to this, the intermediate webs can also be designed only as intermediate web stubs. The side ring region in the end region of the segmental cage has a side ring portion which is designed to be resilient in the axial direction. For example, the side ring portion may be disposed in the same axial portion as the side ring region and/or forms an integral part of the side ring region. The axial resilience may be achieved by a resilient change in position of the side ring portion.

In an example embodiment, the side ring portion is designed to protrude freely, such that the resilient change in position can take place by bending the freely protruding side ring portion.

In an example embodiment, the side ring region has a slit which runs in the circumferential direction and which is open on one side, e.g., on the end side. The slit can also be designed as a groove. The side ring portion is divided in the axial direction by the slit, so that the side ring portion is designed to be elastically resilient in the direction of the slit and/or in the axial direction towards the segmental cage. Such a slit can easily be introduced into the tool during manufacture of the segmental cage so that the transport and/or assembly securing means based thereon is designed ready for manufacture.

In an example embodiment, the segmental cage has an end web region, wherein the end web region may be formed by an end web which transitions into the side ring region in the axial direction. The side ring portion and/or the slit is located in an intersection region between the side ring region and the end web region. On the one hand, this ensures that the interference region is disposed in the end region of the segmental cage. Furthermore, a material region of the segmental cage is selected for the slit and/or the side ring portion which is, firstly, mechanically stable so that the weakened portion caused by the slit has no adverse effects, and, secondly, which is mechanically not further occupied so that a hitherto functionless region can take over the function of the transport and/or assembly securing means.

The segmental cage may be designed as a plastic cage. For example, the segmental cage with the interference region or interference regions may be manufactured in a common injection molding tool, e.g., as a common plastic component.

In an example embodiment, the interference region has a ramp contour, which transitions from a region with maximum axial width to the intermediate region. The ramp contour can be straight, but alternatively it is designed to be curved. For example, the ramp contour with the region of the maximum axial width may lie against the guide flange in a clamping manner.

The disclosure further relates to a swivel lever arrangement for a disc brake, e.g., for a utility vehicle. The swivel lever arrangement is used to transmit a braking force from an actuator, such as a pneumatic cylinder, to a brake shoe with a brake pad.

The swivel lever arrangement has a swivel lever as a first bearing partner. The braking force may be transmitted via the swivel lever. The swivel lever is disposed so to be swivelable about a swivel axis. Furthermore, the swivel lever arrangement has a counter-bearing portion as a second bearing partner. The swivel lever may be connected to the actuator by means of a transmission. The first bearing partner is mounted relative to the second bearing partner with or via a segmental bearing device. The segmental bearing device is designed as described above. In a possible implementation of the swivel lever arrangement, it has two such segmental bearing devices.

BRIEF DESCRIPTION OF THE DRAWINGS

Further features, advantages and effects of the disclosure result from the following description of an exemplary embodiment and the attached figures. In the figures.

DETAILED DESCRIPTION

Figure 1:
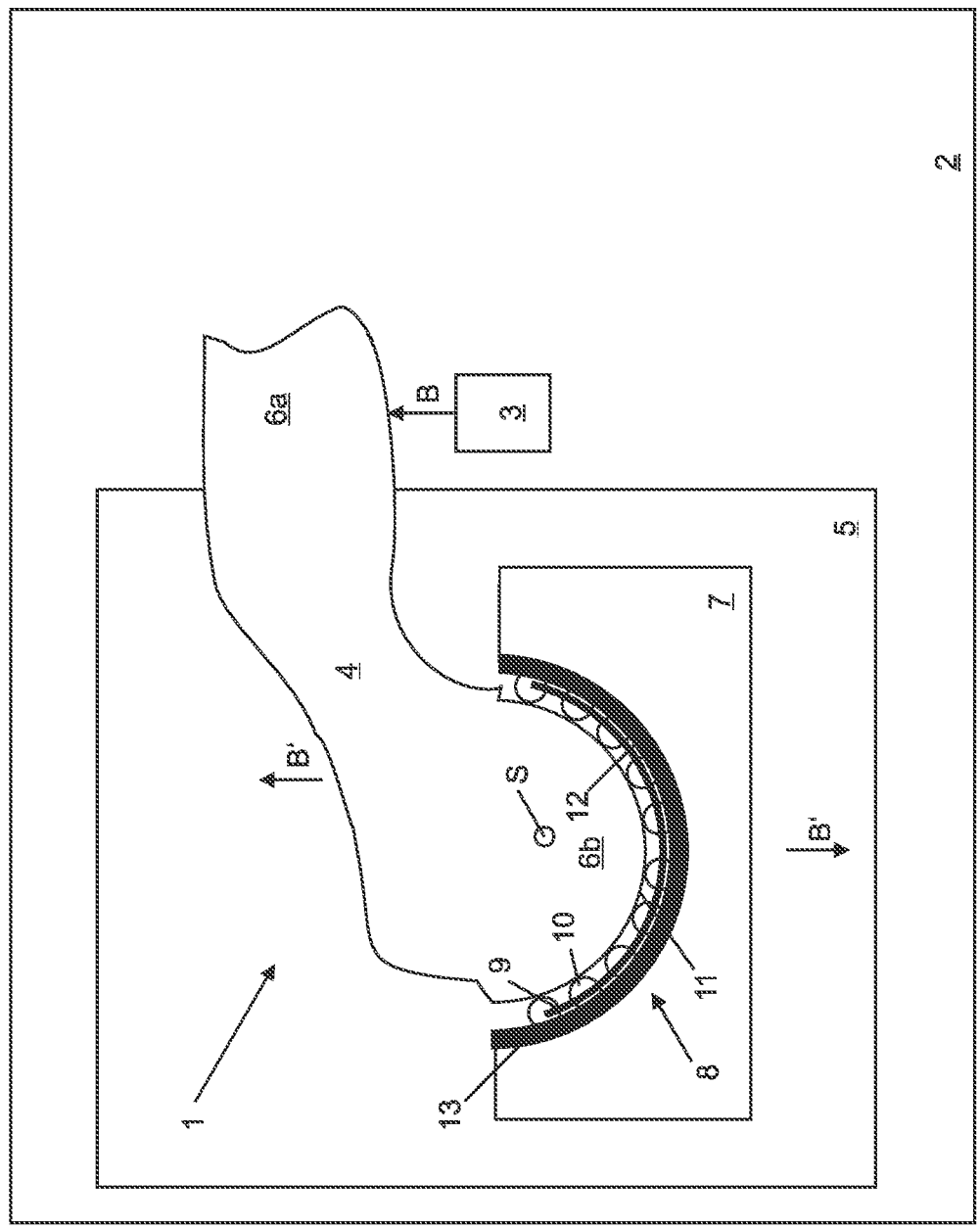
FIG. 1 shows a schematic representation of a swivel lever arrangement as an exemplary embodiment.

FIG. 1 shows, in a schematic lateral view, a swivel lever arrangement 1 for a disc brake 2, which is only shown as a block, for a utility vehicle as an exemplary embodiment. The swivel lever arrangement 1 has the function of deflecting a braking force B introduced by an actuator 3 and, if necessary, translating it and forwarding it as a translated braking force B' in the direction of the brake shoes or brake pads.

The swivel lever arrangement 1 has a swivel lever 4 which is mounted in a brake caliper 5 in a manner swivelable via a swivel axis S. The swivel lever 4 has a free end 6a on which the actuator 3, for example designed as a hydraulic or pneumatic actuator 3, acts. The swivel lever 4 is swivelably mounted about the swivel axis S at a swivel end 6b. The swivel lever 4 is swivelably mounted relative to a counter-bearing portion 7 so that the swivel lever 4 forms a first bearing partner and the counter-bearing portion 7 forms a second bearing partner.

A segmental bearing device 8 is disposed between the swivel lever 4 and the counter-bearing portion 7, which has a segmental cage 9 and a plurality of rolling elements 10, wherein the rolling elements 10 are guided in the cage segment 9. The cage segment 9 extends about the swivel axis S in an angular range of less than 180 degrees. The counter-bearing portion 7 can form part of the brake caliper 5, wherein the translated braking force B' is then forwarded via a region of the swivel lever 4 opposite the segmental bearing device 8, for example via a bridge. As an alternative to this, the counter-bearing portion 7 forms a pressure piece so that the translated braking force B' is forwarded from the pressure piece in the direction of the brake shoes.

The segmental bearing device 8 has a partial shell 13 which is designed as a half-shell and which is disposed on the counter-bearing portion 7. The swivel lever 4 forms a first bearing race 11, and the partial shell 13 forms a second bearing race 12 for the rolling elements 10. The bearing races 11, 12 are, for example, an integral part of the swivel lever 4 or the partial shell 13. The rolling elements 10 may be made of metal to transmit the braking forces. For example, the rolling elements 10 may be designed as cylindrical rollers, e.g., as needles. On the other hand, the segmental cage 9 may be made of a plastic, since it only has to introduce and dissipate small forces.

Figure 2:
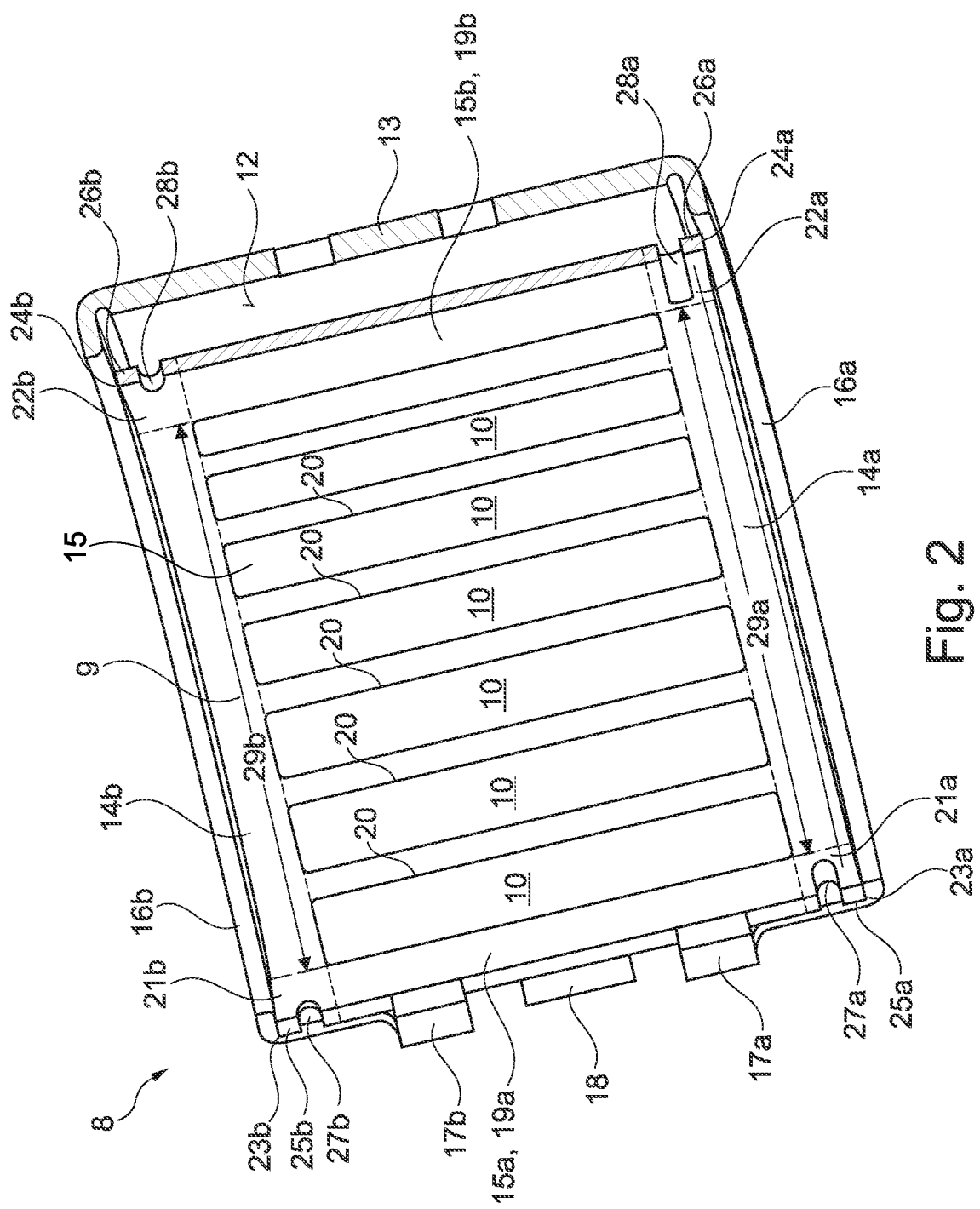
FIG. 2 shows a schematic three-dimensional representation of the segmental bearing device.

FIG. 2 shows a three-dimensional representation of the segmental bearing device 8 in FIG. 1 in a radial plan view from the inside. It can be seen that the partial shell 13 is designed as a shaped sheet metal part. The partial shell 13 provides the second bearing race 12 for the rolling elements 10 on the inner circumference. The partial shell 13 provides the second bearing race 12 for more than 150° and less than 180° in the circumferential direction about the swivel axis S. Guide flanges 16a, b are provided for the segmental cage 9 on the axial sides, which extend over the entire course of the partial shell 13 in the circumferential direction. The guide flanges 16a, b are designed as shaped subregions of the partial shell 13. On the one end side of the partial shell 13 are stop members 17a, b, designed in this exemplary embodiment as integrally formed hooks, which form an end stop for the segmental cage 9. On the other side, the partial shell 13 is designed without a stop so that the segmental cage 9 can be mounted in the partial shell 13 in a simple manner. A lug portion 18, designed as a tab, is integrally formed on the side of the stop members 17a, b and is used for mounting the partial shell 13 and/or the segmental bearing device 8.

The segmental cage 9 is disposed in the partial shell 13. The segmental cage 9 extends in the circumferential direction over a subregion of the partial shell 13 so that it can be moved relative to the partial shell 13 in the circumferential direction about the swivel axis S. The segmental cage 9 is made of plastic and has a plurality of receptacles 20 for the rolling elements 10. The rolling elements 10 are disposed with full complements in the segmental cage 9 so that a high load-bearing capacity is achieved for the available space.

The segmental cage 9 has a side ring region 14a, b on each of the axial end sides. Intermediate webs 15, which delimit the receptacles 20 for the rolling elements 10 in the circumferential direction, extend between the side ring regions 14a, b. The segmental cage 9 has end webs 15a, b at the end sides in the circumferential direction, wherein end regions 19a, b run in the axial direction in the end webs 15a, b. The end webs 15a, b delimit the last receptacle 20 in the circumferential direction and are disposed parallel to the intermediate webs 15 in this exemplary embodiment.

The end region 19a forms intersection regions 21a, b with the side ring regions 14a, b on the one side in the circumferential direction of the segmental cage 9. The end region 19b forms intersection regions 22a, b with the side ring regions 14a, b on the other side in the circumferential direction of the segmental cage 9.

The segmental cage 9 has interference regions 23a, b in the end region 19a, and the segmental cage 9 has interference regions 24a, b in the end region 19b. The interference regions 23a and 24a lie against the guide flange 16a in a clamping manner, and the interference regions 23b and 24b lie against the guide flange 16b in a clamping manner. The interference regions 23a, b and 24a, b have the function of fixing the segmental cage 9 in a clamping manner in the partial shell 13 as a transport and/or assembly securing means. The interference regions 23a, b and 24a, b each have an overdimension in relation to the guide flanges 16a, b. However, the overdimension is dimensioned such that the segmental cage 9 is disposed in the partial shell 13 during operation so as to be swivelable via the rolling elements 10.

The interference regions 23a, b and 24a, b are each disposed in the end regions 19a, b on the two axial sides of the segmental cage 9, such that they fix the segmental cage 9 centrally and/or straight in the partial shell 13.

Between the interference regions 23a and 24a on an axial side of the segmental cage 9, an intermediate region 29a is provided, which is set back in the axial direction relative to the interference regions 23a and 24a. This results in a distance between the segmental cage 9 and the guide board 16a in the intermediate region 29a. The segmental cage 9 is supported on the guide flange 16a via the interference regions 23a and 24a only at certain points. Between the interference regions 23b and 24b on the other axial side of the segmental cage 9, an intermediate region 29b is provided, which is set back in the axial direction relative to the interference regions 23b and 24b. This results in a distance between the segmental cage 9 and the guide flange 16b in the intermediate region 29b. The segmental cage 9 is supported on the guide flange 16b via the interference regions 23b and 24b only at certain points. The support at certain points supports the concept of forming a transport and/or assembly securing means, but leaving the segmental bearing device 8 swivelable for operation. As can be seen from FIG. 2, the intermediate region 29a, b occupies more than 80% or 90% of the circumferential length of the segmental cage 9 in each case.

The side ring regions 14a, b have a side ring portion 25a, b, 26a, b in each end region 19a, b and/or in each intersection region 21a, b, 22a, b, which side ring portion is designed in each case as a web protruding in the circumferential direction. In particular, the side ring portion 25a, b, 26a, b is divided in the side ring region 14a, b by a slit 27a, b, 28a, b, which runs in the circumferential direction and is open at the end. The slit 27a, b, 28a, b can also be referred to as a groove. The interference region 23a, b, 24a, b is disposed in each case on the side ring portion 25a, b, 26a, b, with the respective side ring portions 25a, b, 26a, b being elastically deflected inward in the axial direction due to the overdimension and thereby providing the clamping force against the guide flanges 16a, b.

The slits 27a, b, 28a, b and the side ring portions 25a, b, 26a, b are limited to the intersection regions 21a, b, 22a, b so that they do not weaken the segmental cage 9. In order to further reduce the weakening, the slits 27a, b, 28a, b or the side ring portions 25a, b, 26a, b in the present exemplary embodiment only extend to 50% of the intersection regions 21a, b, 22a, b in the circumferential direction.

Figure 3:
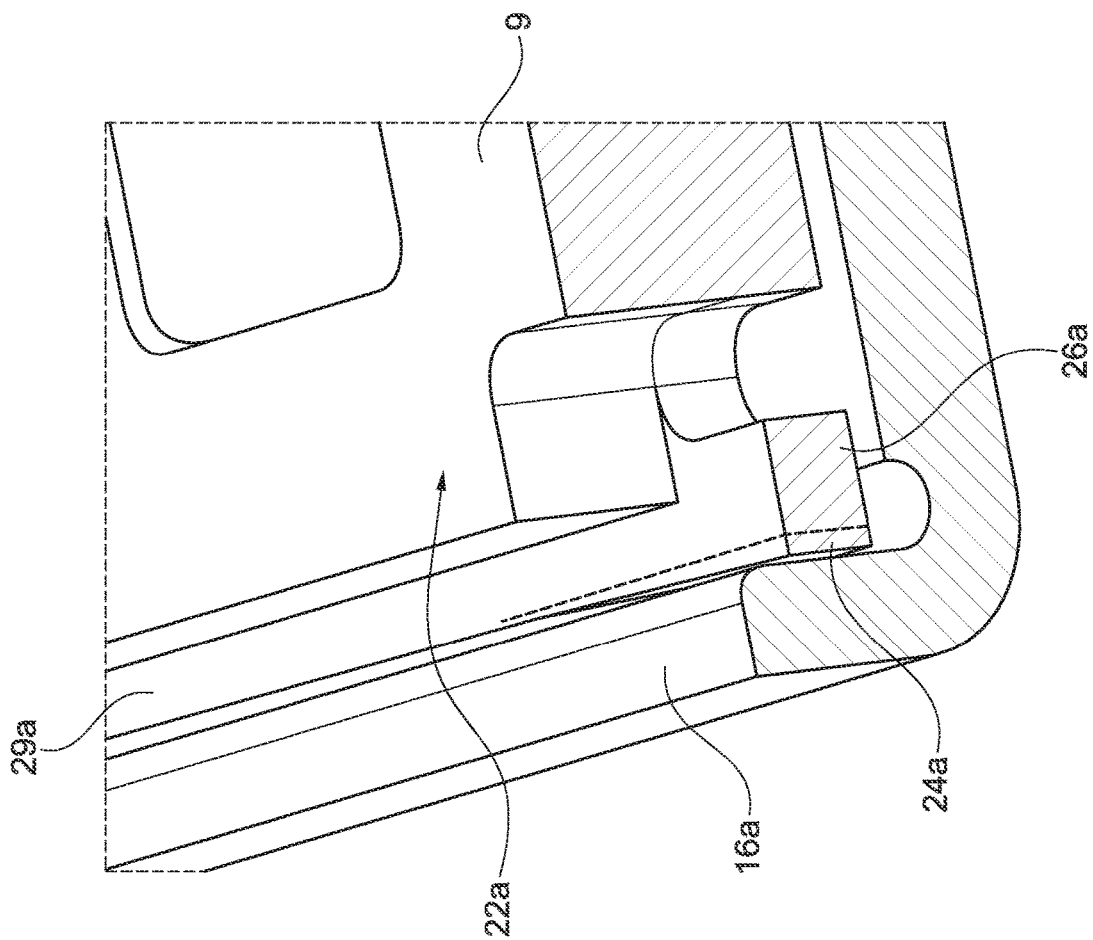
FIG. 3 shows a detail from FIG. 2 in a similar representation.

FIG. 3 shows a schematic, three-dimensional representation of a detail, for example in the intersection region 22a; the other intersection regions 22b, 23a, b are realized analogously. On the one hand, it can be seen more clearly here that the guide flanges 16a, b are designed as beaded flanges, for example. It can also be seen that the interference region 24a is formed integrally in the segmental cage 9 or in the side ring portion 26a. The interference region 24a is indicated by a dashed line. The interference region 24a is designed as a ramp region, which has the greatest axial height at the free end of the side ring portion 26a and then drops in the direction of the intermediate region 29a. It can also be seen that the side ring portion 26a does not extend over the entire radial thickness of the segmental cage 9, but only assumes a part, here half, of the radial thickness of the segmental cage 9. In this way there is only slight clamping.

The segmental cage 9 is formed symmetrically with elements realized as interference regions 23a, b, 24a, b, via which the friction between the segmental cage 9 and the guide flanges 16a, b can be adjusted by the overdimension. In addition, it is slightly resilient by means of the incisions, which are designed as slits 27a, b, 28a, b, which reduces the risk of rupture/breaking/loss of the side ring portions 25a, b, 26a, b as friction elements.

In the segmental cage 9, the friction is generated at certain points and prevents the segmental cage 9 from slipping in the partial shell 13 or out of the partial shell 13. Alternative solutions are more difficult to adjust in production. However, the friction should not be too high (effect on the efficiency of the application) and it should practically only prevent the segmental cage 9 from slipping during the assembly process. After assembly, the anti-slip securing means is no longer required. For this purpose, the incisions/slits 27a, b, 28a, b are also provided for slight, possible resilience. In addition, the anti-slip elements must not be "lost" over the course of their service life, i.e. they must not wear out to such an extent that they fall off or break off. This might happen with other solutions, but the risk does not occur with the segmental cage 9.

REFERENCE NUMERALS

1 Swivel lever arrangement
2 Disc brake
3 Actuator
4 Swivel lever
5 Brake caliper
6a Free end
6b Swivel end
7 Counter-bearing portion
8 Segmental bearing device
9 Segmental cage
10 Rolling element
11 First bearing race
12 Second bearing race
13 Partial shell
14a,b Side ring region
15 Intermediate web
15a,b End webs
16a,b Guide flanges
17a,b Stop members
18 Lug portion
19a,b End regions
20 Receptacles
21a,b Intersection regions in the end region 19a
22a,b Intersection regions in the end region 19b
23a,b Interference regions in the end region 19a
24a,b Interference regions in the end region 19b
25a,b Side ring portion in the end region 19a
26a,b Side ring portion in the end region 19b
27a,b Slit in the end region 19a
28a,b Slit in the end region 19b
29a,b Intermediate region

The invention claimed is:

1. A segmental bearing device for mounting a first bearing partner relative to a second bearing partner about a swivel axis (S), comprising:
a plurality of rolling elements,
a segmental cage for receiving the rolling elements, the segmental cage comprising:
an end region, and
a side ring portion in the end region, the side ring portion comprising a slit which runs in a circumferential direction and is open on a circumferential end,
a partial shell, wherein:
the partial shell provides a bearing race for the rolling elements and axial guide flanges for axially guiding the segmental cage,
the segmental cage has an interference region so that the segmental cage lies against the axial guide flange in an axial direction in a clamping manner, and
the interference region is disposed on the side ring portion, and
the side ring portion is divided by the slit so that the side ring portion is elastically resilient in the axial direction.

2. The segmental bearing device of claim 1, wherein:
the segmental cage has an end web, and
the slit is disposed in an intersection region between the side ring portion and the end web.

3. The segmental bearing device of claim 1, wherein the interference region is designed as a ramp region.

4. A swivel lever arrangement for a disc brake comprising:
a swivel lever as a first bearing partner,
a counter-bearing portion as a second bearing partner, and
the segmental bearing device of claim 1,
wherein:
the swivel lever is swivelably mounted in the counter-bearing portion via the segmental bearing device.

5. A segmental bearing device comprising:
a plurality of rolling elements;
a segmental cage for receiving the plurality of rolling elements, the segmental cage comprising:
a first end region; and
a first interference region disposed in the first end region; and
a partial shell comprising:
a bearing race for the plurality of rolling elements; and
first and second axial guide flanges for axially guiding the segmental cage, wherein the first interference region lies against the first axial guide flange, axially clamping the segmental cage, wherein the first interference region is a first ramp region.

6. The segmental bearing device of claim 5, wherein the segmental cage further comprises:
a second end region, axially opposite the first end region; and
a second interference region disposed in the second end region, wherein the second interference region lies against the second axial guide flange, axially clamping the segmental cage.

7. The segmental bearing device according to claim 6, wherein the segment cage further comprises:
a third end region, circumferentially opposite the first end region;
a third interference region disposed in the third end region;
a fourth end region, axially opposite the third end region; and
a fourth interference region disposed in the fourth end region wherein:
the third interference region lies against the first axial guide flange, axially clamping the segmental cage; and the fourth interference region lies against the second axial guide flange, axially clamping the segmental cage.

8. The segmental bearing device of claim 7, wherein the segment cage further comprises:
a first intermediate region disposed between the first end region and the third end region, the first intermediate region set back relative to the first interference region and the third interference region, with a first gap to the first axial guide flange; and
a second intermediate region disposed between the second end region and the fourth end region, the second intermediate region set back relative to the second interference region and the fourth interference region, with a second gap to the second axial guide flange.

9. The segmental bearing device of claim 8, wherein:
the first intermediate region extends along at least 80% of a total circumferential length of the segmental cage; and
the second intermediate region extends along at least 80% of the total circumferential length of the segmental cage.

10. The segmental bearing device of claim 5, wherein:
the segmental cage comprises a first side ring region, the first side ring region comprising a first side ring portion in the first end region that is axially resilient; and
the first interference region is disposed on the first side ring portion.

11. The segmental bearing device of claim 10, wherein:
the first side ring region comprises a first circumferential slit that is open on a circumferential end; and
the first side ring portion is divided by the first circumferential slit to be elastically resilient in an axial direction.

12. The segmental bearing device of claim 11 wherein:
the segmental cage further comprises:
a first end web; and
a first intersection region between the first side ring region and the first end web; and
the first side ring portion or the first circumferential slit is disposed in the first intersection region.

13. A swivel lever arrangement for a disc brake comprising:
a swivel lever as a first bearing partner;
a counter-bearing portion as a second bearing partner; and
the segmental bearing device of claim 5, wherein the swivel lever is swivelably mounted in the counter-bearing portion via the segmental bearing device.

* * * * *